(12) United States Patent
Ganesan et al.

(10) Patent No.: US 11,070,354 B2
(45) Date of Patent: Jul. 20, 2021

(54) SYSTEM AND METHOD FOR GENERATING A SYMMETRICALLY BALANCED OUTPUT

(71) Applicant: Lovely Professional University, Phagwara (IN)

(72) Inventors: Geetha Ganesan, Phagwara (IN); Rahul Saha, Phagwara (IN)

(73) Assignee: Lovely Professional University, Phagwara (IN)

( * ) Notice: Subject to any disclaimer, the term of this patent is extended or adjusted under 35 U.S.C. 154(b) by 225 days.

(21) Appl. No.: 16/140,245

(22) Filed: Sep. 24, 2018

(65) Prior Publication Data
US 2019/0097786 A1 Mar. 28, 2019

(51) Int. Cl.
*H04L 9/00* (2006.01)
*H04L 9/06* (2006.01)

(52) U.S. Cl.
CPC ............ *H04L 9/002* (2013.01); *H04L 9/0643* (2013.01); *H04L 2209/08* (2013.01)

(58) Field of Classification Search
CPC ... H04L 9/002; H04L 9/0643; H04L 2209/08; H04L 9/0668; H04L 9/0631; H04L 9/0861; H04L 2209/12
See application file for complete search history.

(56) References Cited

U.S. PATENT DOCUMENTS

| | | | | |
|---|---|---|---|---|
| 6,182,216 | B1* | 1/2001 | Luyster | H04L 9/002 380/28 |
| 2012/0284532 | A1* | 11/2012 | Wang | G06F 21/602 713/190 |
| 2018/0176011 | A1* | 6/2018 | Hars | H04L 9/0625 |

FOREIGN PATENT DOCUMENTS

CN 106411499 A 2/2017

OTHER PUBLICATIONS

On The Design of S-Boxes, A. F. Webster and S. E. Tavares, Department of Electrical Engineering, Queen's University, Kingston, Ont. Canada, published in LNCS No. 218, pp. 523-534, (1986). Retrieved from the Internet at http://citeseerx.ist.psu.edu/viewdoc/su.*

Rahul Saha and Geetha Ganesan, Symmetric random function generator (SRFG): A novel cryptographic primitive for designing fast and robust algorithms, Chaos, Solitons & Fractals, Nov. 2017, pp. 371-377, vol. 104, Elsevier, Amsterdam, Netherlands.

* cited by examiner

*Primary Examiner* — Paul E Callahan
(74) *Attorney, Agent, or Firm* — Lombard & Geliebter LLP; Eric J. Huang (57) ABSTRACT

Disclosed are a system and method for generating a symmetrically balanced output to accomplish a plurality of predefined properties. The method comprises a step of receiving a plurality of registers with B bits, an expression length, and a plurality of operators through a receiving module. The method then includes a step of generating a random expression population through a random expression population generation module. Further, the method includes the step of computing a fitness value of the random expression population through a fitness function module. The method then includes the step of providing registers with B bits if a plurality of output bits are having an equal number of 1s and 0s through a conditional module. The conditional module performs mutation in the operators if the output bits are not having an equal number of 1s and 0s.

12 Claims, 8 Drawing Sheets

SYSTEM AND METHOD FOR GENERATING A SYMMETRICALLY BALANCED OUTPUT

FIELD OF INVENTION

The present invention relates to the generation of a symmetrically balanced output, in particular to system and method for producing a symmetrically balanced output to accomplish a plurality of predefined properties such as balancedness, resiliency, non-linearity, propagation, immunity, and symmetricity.

BACKGROUND

Typically, the symmetric Boolean function is a Boolean function whose value does not depend on the permutation of its input bits, i.e., it depends only on the number of ones in the input. Further, the symmetric Boolean function is a specialized function which considers the hamming weight of the input string. Hence, the existing symmetric Boolean function cannot be effectively utilized to perform Monte Carlo experimentation and performance analysis.

Chinese patent number 10,641,1499 A filed by Wu Liji et al. discloses a system and method related to RC4 hardware circuit mark protection. The method includes a step of inputting a secret key and grouping S box grouping. Then the method performs grouping with the same number of the inputted secret keys and the S boxes. Then the method introduces random numbers to the inputted secret keys and the S boxes at the same time. The inputted secret keys and the S boxes are subjected to grouping. The sum of each part is the same as the content of the inputted secret keys and the S boxes which don't have protection. The S box initial permutation step: performing an initial permutation of the grouping S boxes according to the grouping inputted secret keys. The secret keystream generation comprises a step of performing permutation once again of the grouping S boxes after the initial permutation and taking the sum of the grouping S boxes after the permutation once again as a new index. The content of the S boxes pointed by the new index is an output secret keystream. Through adoption of the algorithm level defensive measure, the RC4 hardware circuit mark protection method and system quote pseudo-random numbers to take as masks to resist to the power consumption attack, especially the template attack aiming at the RC4. However, the Wu Liji patent application utilizes a specific stream cipher algorithm, i.e. RC4 and does not provide a plurality of solutions such as to obtaining samples from various distributions (Gamma, Beta, etc.) in a machine learning (ML) environment, and generating Hash algorithm and performing a performance analysis of the cryptographic hashes.

There is a need for an efficient, elegant and effective solution for generating a symmetrically balanced output. Further, there is a need for a system and method to provide a true random system that combines input variables and traditional logic gates to provide output random bit patterns.

Thus, in view of the above, there is a long-felt need in the industry to address the aforementioned deficiencies and inadequacies.

Further limitations and disadvantages of conventional and traditional approaches will become apparent to one of skill in the art through comparison of described systems with some aspects of the present disclosure, as set forth in the remainder of the present application and with reference to the drawings.

All publications herein are incorporated by reference to the same extent as if each publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

As used in the description herein and throughout the claims that follow, the meaning of "a," "an," and "the" includes plural reference unless the context dictates otherwise. Also, as used in the description herein, the meaning of "in" includes "in" and "on" unless the context dictates otherwise.

SUMMARY

The present invention mainly solves the technical problems existing in the prior art. In response to these problems, the present invention provides a system and method for generating a symmetrically balanced output to accomplish a plurality of predefined properties.

An aspect of the present disclosure relates to a method for generating a symmetrically balanced output to accomplish a plurality of predefined properties. The method comprises a step of receiving a plurality of registers with B bits, an expression length, and a plurality of operators through a receiving module. The method then includes a step of generating a random expression population through a random expression population generation module. Further, the method includes the step of computing a fitness value of the random expression population through a fitness function module. The method then includes the step of providing registers with B bits if a plurality of output bits are having an equal number of 1s and 0s through a conditional module. The conditional module performs mutation in the operators if the output bits are not having an equal number of 1s and 0s.

In an aspect, the mutation in the operators is performed by changing a combination of at least one a plurality of logic gates, the registers and a plurality of variables.

In an aspect, the expression length is a number of terms in a combined function.

In an aspect, the combined function comprises the logic gates to strengthen a plurality of hash algorithms, a plurality of stream ciphers and a round function module of block ciphers.

In an aspect, the present method utilizes a hamming distance of output string to compute a distance between at least two strings of equal length.

In an aspect, the predefined properties comprise balancedness, resiliency, non-linearity, propagation, immunity, and symmetricity.

An aspect of the present disclosure relates to a device in a network. The device includes a non-transitory storage device having embodied therein one or more routines operable to generate a symmetrically balanced output to accomplish a plurality of predefined properties. The one or more routines include a receiving module, a random expression population generation module, a fitness function module, and a conditional module.

The receiving module receives a plurality of registers with B bits, an expression length, and a plurality of operators. The random expression population generation module generates a random expression population. The fitness function module computes a fitness value of the random expression population. The conditional module provides registers with B bits if a plurality of output bits are having an equal number of 1s and 0s. The conditional module performs mutation in the operators if the output bits are not having an equal number of 1s and 0s.

An aspect of the present disclosure relates to a system for generating a symmetrically balanced output to accomplish a plurality of predefined properties. The system includes a processor and a memory. The memory stores machine-readable instructions that when executed by the processor cause the processor to receive a plurality of registers with B bits, an expression length, and a plurality of operators through a receiving module. The processor is further configured to generate a random expression population through a random expression population generation module. The processor is then configured to compute a fitness value of the random expression population through a fitness function module. Further, the processor is configured to provide registers with B bits if a plurality of output bits are having an equal number of 1s and 0s through a conditional module. The conditional module performs mutation in the operators if the output bits are not having an equal number of 1s and 0s.

Accordingly, one advantage of the present invention is that it generates a hash algorithm and performance analysis of cryptographic hashes.

Accordingly, one advantage of the present invention is that it enables the Monte Carlo experimentation and provides outputs with any feasible source by integrating a function output over a large parameter space and selecting random values within that parameter space and averaging the resulting function values.

Accordingly, one advantage of the present invention is that it provides a digital display with the effect of rotation and scaling which can be analyzed using the randomization of pixel area using this concept.

Accordingly, one advantage of the present invention is that it can be used as a basis to obtain samples from more interesting distributions (Gamma, Beta, etc.) in a machine learning and statistical learning environment.

Accordingly, one advantage of the present invention is that it is applicable in CAPTCHA technology as a random selection of images or texts or even merging the text and images.

Accordingly, one advantage of the present invention is that it can be used in amortized searching and sorting algorithms.

Other features of embodiments of the present disclosure will be apparent from accompanying drawings and from the detailed description that follows.

BRIEF DESCRIPTION OF THE DRAWINGS

In the figures, similar components and/or features may have the same reference label. Further, various components of the same type may be distinguished by following the reference label with a second label that distinguishes among the similar components. If only the first reference label is used in the specification, the description applies to any one of the similar components having the same first reference label irrespective of the second reference label.

DETAILED DESCRIPTION

Systems and methods are disclosed for generating a symmetrically balanced output to accomplish a plurality of predefined properties. Embodiments of the present disclosure include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, and firmware.

Embodiments of the present disclosure may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the disclosure could be accomplished by modules, routines, subroutines, or subparts of a computer program product.

The present invention discloses a system and method whereby a true random system that produces the symmetric balanced output that fulfills the properties such as balancedness, resiliency, non-linearity, propagation and immunity (BaReNPI). The cryptographic functions of the computer are improved and such improvements change conventional function generators. The technical solution provided by the present invention is pertaining to the function generator can be applied for any cryptographic algorithms for more robust algorithm. The present system considers the hamming distance of output string. Further, the present system outputs a combined function comprising of logic gates which helps the hash algorithms, stream ciphers and round function module of block ciphers to be more robust. Further, the present invention provides the function generator which can be utilzied for key generators.

Typically, algorithms such as DES, AES and other block ciphers use fixed round functions. However, the present invention uses BaReNPI true random system for better avalanche effect. Moreover, stream ciphers which use pseudo random number generator are vulnerable to attack. Therefore, uses of the present BaReNPI true random system in stream ciphers makes the ciphers more robust.

Although the present disclosure has been described with the purpose for generating a symmetrically balanced output to accomplish a plurality of predefined properties, it should be appreciated that the same has been done merely to illustrate the invention in an exemplary manner and any other purpose or function for which explained structures or configurations could be used, is covered within the scope of the present disclosure.

Exemplary embodiments will now be described more fully hereinafter with reference to the accompanying drawings, in which exemplary embodiments are shown. This invention may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular name.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail to avoid obscuring the embodiments.

The term "machine-readable storage medium" or "computer-readable storage medium" includes, but is not limited to, portable or non-portable storage devices, optical storage devices, and various other mediums capable of storing, containing, or carrying instruction(s) and/or data. A machine-readable medium may include a non-transitory medium in which data can be stored, and that does not include carrier waves and/or transitory electronic signals propagating wirelessly or over wired connections. Examples of a non-transitory medium may include but are not limited to, a magnetic disk or tape, optical storage media such as compact disk (CD) or versatile digital disk (DVD), flash memory, memory or memory devices.

Figure 1:
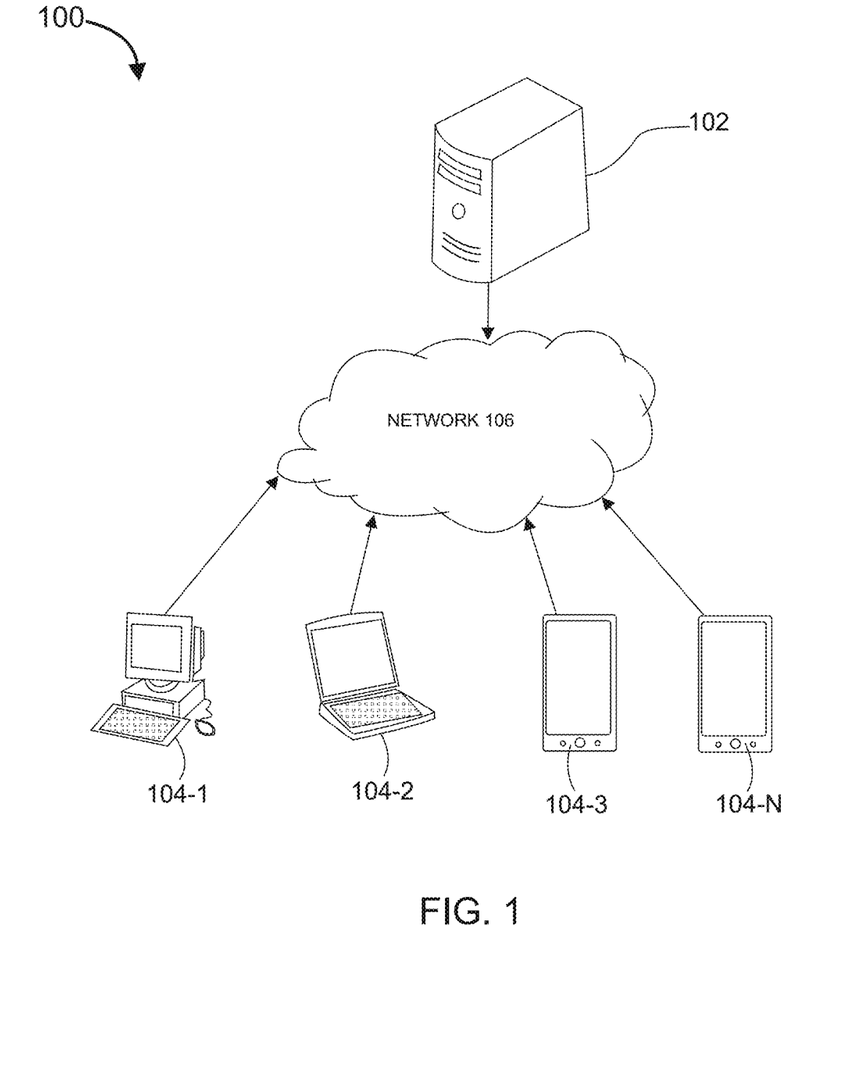
FIG. 1 illustrates a network implementation of the present system and method for generating a symmetrically balanced output to accomplish a plurality of predefined properties, in accordance with an embodiment of the present subject matter.

FIG. 1 illustrates a network implementation 100 of the present system and method for generating a symmetrically balanced output to accomplish a plurality of predefined properties, in accordance with an embodiment of the present subject matter. Although the present subject matter is explained considering that the present system 102 is implemented on a server, it may be understood that the present system 102 may also be implemented in a variety of computing systems, such as a laptop computer, a desktop computer, a notebook, a workstation, a mainframe computer, a server, a network server, and the like. It will be understood that the present system 102 may be accessed by multiple users through one or more computing devices 104-1, 104-2 . . . 104-N, collectively referred to as computing unit 104 hereinafter, or applications residing on the computing device 104. Examples of the computing device 104 may include but are not limited to, a portable computer, a personal digital assistant, a handheld or mobile device, smart devices, and a workstation. The computing devices 104 are communicatively acccessible to the present system 102 through a network 106.

In one implementation, the network 106 may be a wireless network, a wired network or a combination thereof. The network 106 can be implemented as one of the different types of networks, such as an intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further, the network 106 may include a variety of network devices, including routers, bridges, servers, computing devices, storage devices, and the like.

Figure 2:
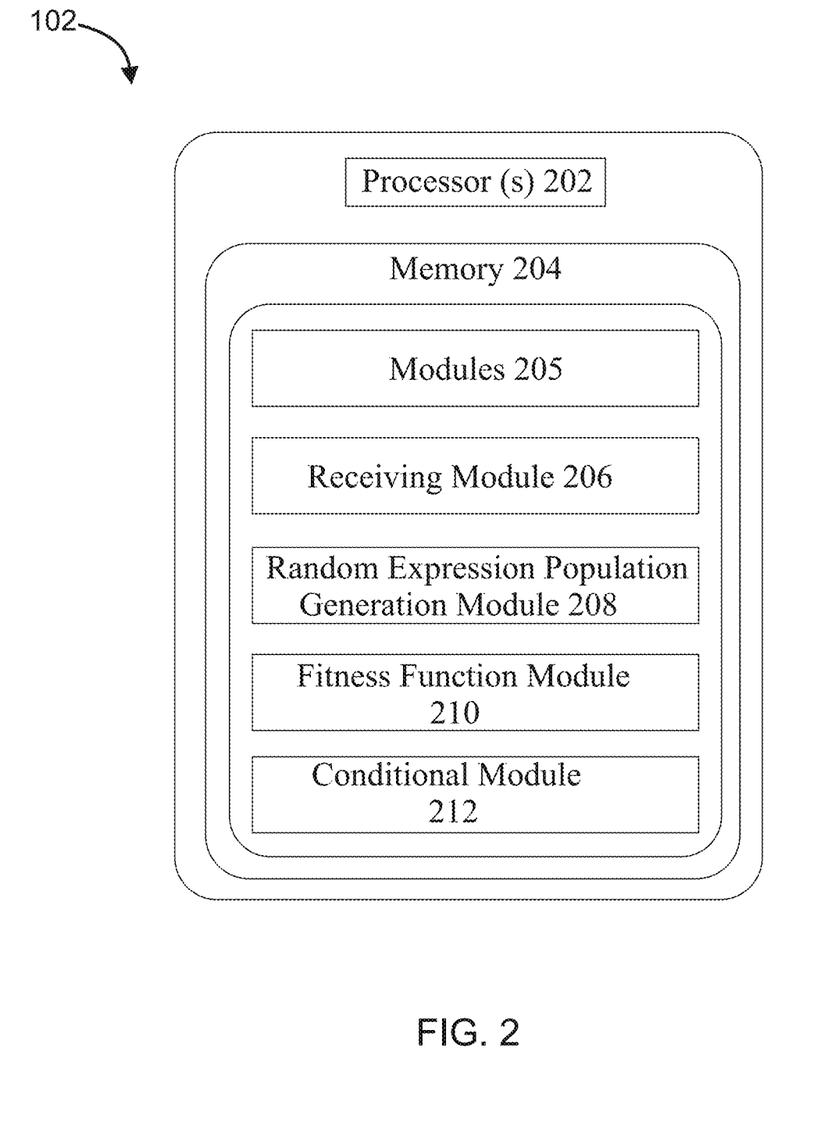
FIG. 2 illustrates a block diagram of the present system for generating a symmetrically balanced output to accomplish a plurality of predefined properties, in accordance with an embodiment of the present subject matter.

FIG. 2 illustrates a block diagram of the present system 102 for generating a symmetrically balanced output to accomplish a plurality of predefined properties, in accordance with an embodiment of the present subject matter. In an embodiment, the predefined properties comprise balancedness, resiliency, non-linearity, propagation, immunity, and symmetricity. The system 102 may include at least one processor 202, and a memory 204. The processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 204.

The memory 204 may include any computer-readable medium known in the art including, for example, volatile memory, such as static random access memory (SRAM) and dynamic random access memory (DRAM), and/or non-volatile memory, such as read-only memory (ROM), erasable programmable ROM, flash memories, hard disks, optical disks, and magnetic tapes. The memory 204 may include modules 205.

The modules 205 include routines, programs, objects, components, data structures, etc., which perform particular tasks or implement particular abstract data types. In one implementation, the modules 205 may include a receiving module 206, a random expression population generation module 208, a fitness function module 210 and a conditional module 212.

In one implementation, the receiving module 206 receives a plurality of registers with B bits, an expression length, and a plurality of operators. In an embodiment, the expression length is a number of terms in a combined function. In an embodiment, the combined function comprises the logic gates to strengthen a plurality of hash algorithms, a plurality of stream ciphers and a round function module of block ciphers.

The random expression population generation module 208 generates a random expression of the population. The fitness function module 210 computes a fitness value of the random expression population. The conditional module 212 provides registers with B bits if a plurality of output bits are having an equal number of 1s and 0s. The conditional module 214 performs mutation in the operators if the output bits are not having an equal number of 1s and 0s. In an embodiment, the mutation in the operators is performed by changing a combination of at least one a plurality of logic gates, the registers and a plurality of variables. The present system 102 utilizes a hamming distance of output string to compute a distance between at least two strings of equal length.

Figure 3:
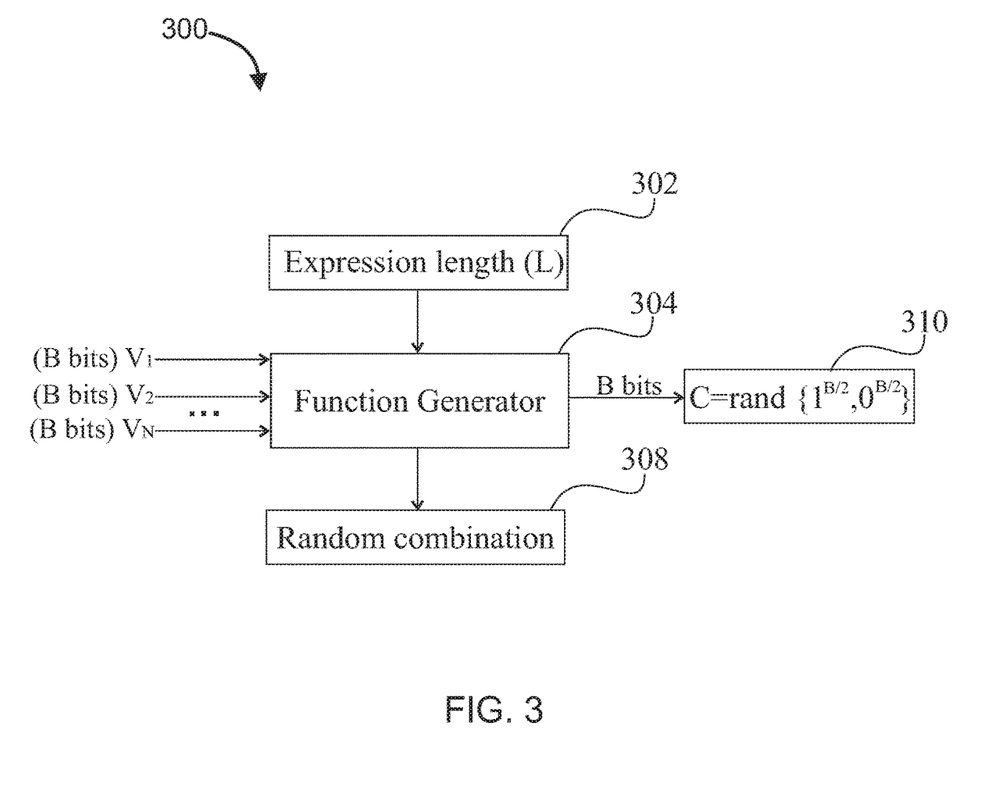
FIG. 3 illustrates an exemplary structure of the present system for two variables of n bits, in accordance with at least one embodiment.

FIG. 3 illustrates an exemplary structure 300 of the present system for two variables of n bits, in accordance with at least one embodiment. The present system outputs a combined function 310 which includes logic gates to help the hash algorithms, stream ciphers and round function module of block ciphers to be more robust. The expression for the proposed combined function generator 304 is given as:

$$f_c = \otimes f_i^L \qquad (1)$$

where, i represents the number of logic gates; L represents the expression length 302 (Number of terms in the combined function $f_c$) and $\otimes$ represents the random combination 308.

To emphasize the randomness in such combined function generator 304, the above equation (1) is further expressed in terms of N input variables' randomness in the selection, as shown in equation 2.

$$f_c(V_1, V_2, \ldots, V_N) = \otimes f_i^L[\text{rand}(V_1, V_2, \ldots, V_N)] \qquad (2)$$

Figure 4A:
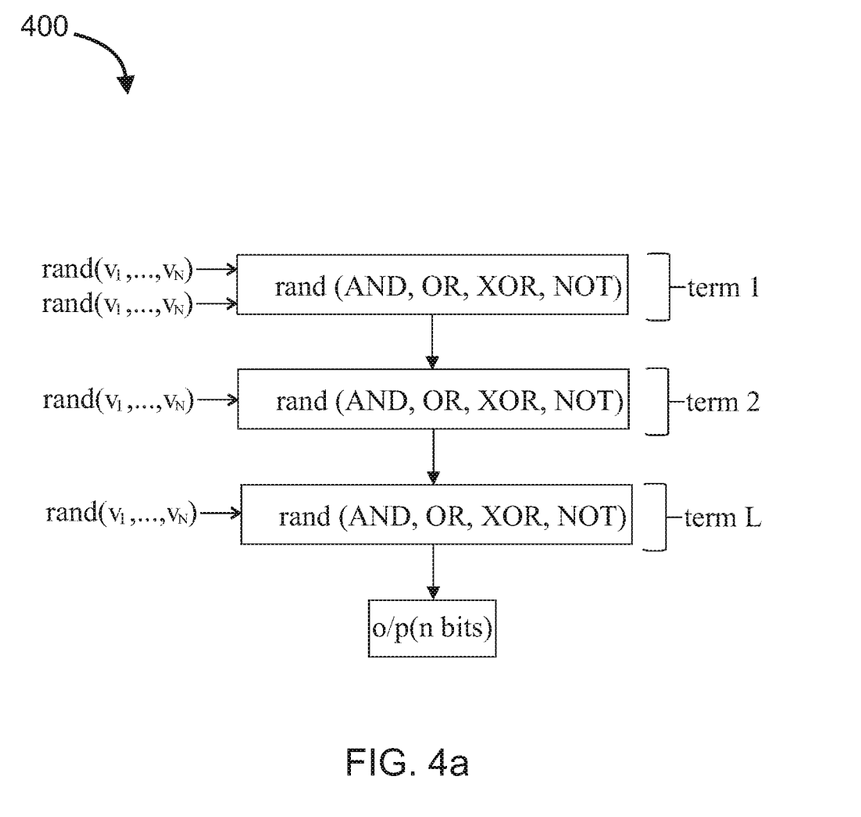
FIG. 4a illustrates an exemplary diagram of the chaining of randomization, in accordance with at least one embodiment.

FIG. 4a illustrates an exemplary diagram 400 of the chaining of randomization, in accordance with at least one embodiment. The structure is shown in the FIG. 3 can be expanded as the function generator can be used for any N variables of n bits each as shown in FIG. 4. Let $F_2$ is the finite field of two elements $\{0,1\}$ and $\oplus$ is any operation of the field $F_2$. N variables are used and each variable is considered to be a n bit vector $v = \{v_1, v_2, \ldots, v_n\}$. In the further discussion each variable $V_i$ is considered as a binary vector v.

The Hamming Weight of such a binary vector v is given by following equation 3:

$$wt(v) = \Sigma_{i=1}^n v_i \qquad (3)$$

Proposition 1: A combined function $f_c$ using n bit variables and generating an output $v_o$ of n bits is symmetric iff $$\sum_{i=1}^n v_{o_i} = \frac{n}{2}$$

where, $v_{o_i} \in \{0,1\}$.

For any number of variables of n bits, the bit patterns follow a bell-curve of normal distribution and the standard deviation from the mean is very low. Therefore, just analysing n/2 combinations of the bit patterns the original bit information can be achieved. Therefore, if the present system constructs to randomize the operations in the function level, each iteration provides the same bitsums and therefore hard to detect the function patterns.

Proposition 2: Let n be an odd integer and $v_o$ is the output of the combined function $f_c$, $f_c$ is the random symmetric function iff 0 is added in the least significant bit (LSB) of the variable.

$$\sum_{i=1}^n v_{o_i} = \frac{n}{2}, \forall n \text{ is even} \qquad (4)$$

and $$\sum_{i=1}^n v_{o_i} + LSB(0) = \frac{n}{2}, \forall n \text{ is odd} \qquad (5)$$

Let $\mathcal{B}_N$ the set of all symmetric random combined Boolean functions on N variables of all the functions from $F_2^N$ into $F_2$ where $F_2^N = \{(V_1, V_2, \ldots, V_N) | V_i \in F_2\}$.

Any combined function $f_c \in \mathcal{B}_N$ of L terms is expressed as a polynomial which is basically termed as Algebraic Normal Form (ANF) of the function and given as:

$$f_c(V_1, V_2, \ldots, V_N) = \oplus \lambda_u (\Pi_{i=1}^N \text{rand}(V_i)^{u_i})^L,$$
$$\lambda_u \in F_2 u \in F_2^N \text{ and } L \in \mathbb{Z} \qquad (6)$$

with $\lambda_u = \oplus f_c(v), v \preceq u, \forall V_i = \{v_{i_1}, v_{i_2}, \ldots, v_{i_n}\} \qquad (7)$ where, $(v_{i_1}, v_{i_2}, \ldots, v_{i_n}) \preceq (u_1, u_2, \ldots, u_n)$ iff $\forall i,j, v_{i_j} \leq u_i$. $\qquad (8)$ For any random combined function $f_c \in \mathcal{B}_N$ generated by the present system is expressed by a binary bit vector of length $2^N$. This vector is comprised of all the values $f_c(y)$, $y \in F_2^N$ The degree of function $f_c$ is denoted by deg($f_c$) and computed as the maximal value of the weights of the output vector $v_{o_i}$ given as:

$$wt(v_{o_i}) = \frac{n}{2}, \text{ such that } \lambda_u \neq 0 \quad (9)$$

Any function $e \in F_2^N$, $\varphi_e$ denotes the linear function in $\mathcal{B}_N: x \mapsto e.x$, where (.) is the dot operation of two vectors. The sequence of Walsh functions $W_k: [0,1] \rightarrow \{-1,1\}$, $k \in \mathbb{N}$ is defined as below:

$$W_k(f_c) = (-1)^{\Sigma_{j=0}^\infty k_j v_j + 1} \quad (10)$$

Following the equation 10, the Walsh coefficient of $f_c \in \mathcal{B}_N$ in point $e \in F_2^N$ is given as:

$$W_e(f_c + \varphi_e) = (-1)^{\Sigma_{j=0}^\infty v_j + 1 + e.x} \quad (11)$$

The series of values for the Walsh coefficients $W_e(f_c + \varphi_e)$, $e \in F_2^N$ forms the Walsh spectrum S of the function $f_c$. The Walsh spectrum S of an N-variable combinational logic function actually represents the function itself.

$$\forall a \in F_2^N, W(f_c + \varphi_e) = \Sigma_{w=0}^N (-1)^{v \cdot w} P_w(wt(a)) \quad (12)$$

Where, $P_w$ is the Krawtchouk polynomial of degree w given as:

$$P_w(i) = \sum_{k=0}^w \binom{i}{k}\binom{N-i}{w-k}(-1)^k \quad (13)$$

The equation 12 and equation 13 represent the symmetric feature of the Walsh transformations of $f_c$.

The output of $f_c$ depends on the weight of its input vectors. As a result, $f_c$ corresponds to a function $g_c: \{0, 1, \ldots, n\} \rightarrow F_2$ such that $\forall x \in F_2^N, f_c(x) = g_c(wt(x))$. The sequence $g_c(f_c) = (g_c(0), g_c(1) \ldots, g_c(n))$ for n-bit vector is considered as simplified value vector of $f_c$. To establish the relation between simplified value vector and arithmetic normal form the equation of 6 can be rewritten as shown in Equation 13.

$$f_c(V_1, V_2, \ldots, V_N) = \oplus \lambda_f(j) \Gamma(\Pi_{i=1}^N \text{rand } (V_i)^{u_i})^L \quad (14)$$

$$= \oplus \lambda_f(j) \mathcal{X}_{j,N} \quad (15)$$

where, $\lambda_f(j)$, $u \lfloor F_2^N$ and $L \in \mathbb{Z}$, $j=\{1, \ldots, N\}$. $\mathcal{X}_{j,N}$ is the elementary polynomial of degree j with N variables. The coefficients of arithmetic normal form of $f_c$ is represented by n-bit vector, $\lambda(f_c) = \{\lambda_f(0), \lambda_f(1), \ldots, \lambda_f(N)\}$, called as simplified vector of ANF of $f_c$.

Following the equation 15, for a given x of weight, $\mathcal{X}_{j,N}$ contains $$\binom{j}{k}$$

nonzero monomials. The expression of binomial coefficients modulo a prime number $\mathcal{P}$ is given by Lucas Theorem. Given two integers, r and s and their $\mathcal{P}$-adic representations, $r = \Sigma_{i=0}^k r_i \mathcal{P}^i$ and $s = \Sigma_{i=0}^k s_i \mathcal{P}^i$, by Lucas theorem, following equation is obtained.

$$\binom{r}{s} \equiv \Pi_{i=0}^k \binom{r_i}{s_i} \mod \mathcal{P} \quad (16)$$

For $\mathcal{P} = 2$, the present system obtains get:

$$\binom{r}{s} \equiv 1$$

mod 2 iff supp(s)⊆supp (r) i.e. $s \leq r$ which means that $\forall i$, $s_i \leq r_i$. Following values are obtained for $g_c$ and $\lambda_f$ as below.

$$g_c(i) = \oplus(_k^i) \text{ for, } k=0,1,\ldots,i \quad (17)$$

$$\lambda(k) = \oplus \lambda_f(k), k \leq i \quad (18)$$

Further, the present disclosure describes the properties of the present BaReNPI True Random System. Balanced property of the BaReNPI True Random system generates combined function $f_c$ exists if its simplified value vector $g_c$ follows the following condition.

$$\forall 0 \leq i \leq N, g_c(i) = g_c(N-i) \boxplus 1, \text{ where } \boxplus \text{ is sum over } F_2 \quad (19)$$

Trivial balanced functions exactly correspond to symmetric functions. Therefore, the combined function $f_c$ verifies the condition $D_1 f_c = 1$ signifying the all-one vector. Functions with $D_1 f_c = 1$ do not really exist for even values of n because for any vectory such that $wt(v) = n/2$, The $D_1 f_c$ can be calculated as:

$$D_1 f_c = f_c(v) \boxplus f_c(v+1) = g_c(n/2) \boxplus g_c(n/2) = 0 \quad (20)$$

The above trivial balanced function property also corresponds to the odd case of trivial partitioning whereas the even cases represent the affine functions. Finding the patterns of the simplified value vector $g_c$ of the combined function $f_c$ leads to the set of the n binomial coefficients for balanced symmetric function.

The resiliency of cryptographic functions is another important characteristic for designing robust and efficient algorithms in cryptography. The correlation between the output of the generated function and a small subset of its input variables leads to the correlation attack. A given symmetric balanced combined function $f_c$ of N variables are m-resilient if it remains balanced when any m input variables are fixed and remaining (n-m) bits are altered. There is no upper or lower bound on the order of resiliency of such functions; the function is more resilient if m is higher. The property of resiliency is related to the weights of the restrictions of the $f_c$ to some subspaces.

$\forall f_c \in \mathcal{B}_N$ and any affine any subspace $\mathcal{S} \subset F_2^N$, the restriction of $f_c$ to $\mathcal{S}$ is the function given as:

$$f_\mathcal{S} : \mathcal{S} \rightarrow F_2 \quad (21)$$

$$x \mapsto f_c(x), \forall x \in \mathcal{S} \quad (22)$$

where, $f \mathcal{S}$ can be determined by the with a function of dim ($\mathcal{S}$) variables.

The subspace $\mathcal{S}$ is spanned by k canonical basis vectors and its supplementary subspace is $\bar{\mathcal{S}}$. The restrictions of $f_c$ to $\mathcal{S}$ and to all its cosets are given by $a + \mathcal{S}$ where, $a \in \bar{\mathcal{S}}$. When $f_c$ is symmetric and balanced, $\mathcal{S}$ is represented as: $\mathcal{S} = \langle s_1, s_2, \ldots, s_k \rangle$ and $f_{a+}\mathcal{S}$ becomes symmetric and balanced too. Moreover, for all $s \in \mathcal{S}$, the following equation can be expressed.

$$f_{a+}\mathcal{S}(s) = f(a+s) = g_c(wt(a) + wt(s)) \quad (23)$$

which depends upon the weight of s when a is fixed. The simplified value vector and the simplified ANF vector of $f_{a+s}$ can be deduced from $f_c$ as given below.

$$g_{c_{f_{a+S}}}(i) = g_c(i+wt(a)), \forall i, 0 \le i \le k \quad (24)$$

$$\lambda_{f_{a+S}}(i) = \oplus \lambda_f(i+j), \forall i, 0 \le i \le k \text{ and } j \preccurlyeq wt(a) \quad (25)$$

Nonlinearity is an important design characteristic for cryptographic functions used in cryptographic algorithms to prevent different types of correlation or linear attacks. In our proposed combined function generator, this feature depends on the output vectors in $v_{o_i} \cdot v_{o_j}$ is also considered as the affine transformations of the functions generated from the present BaReNPI true random system.

Figure 4B:
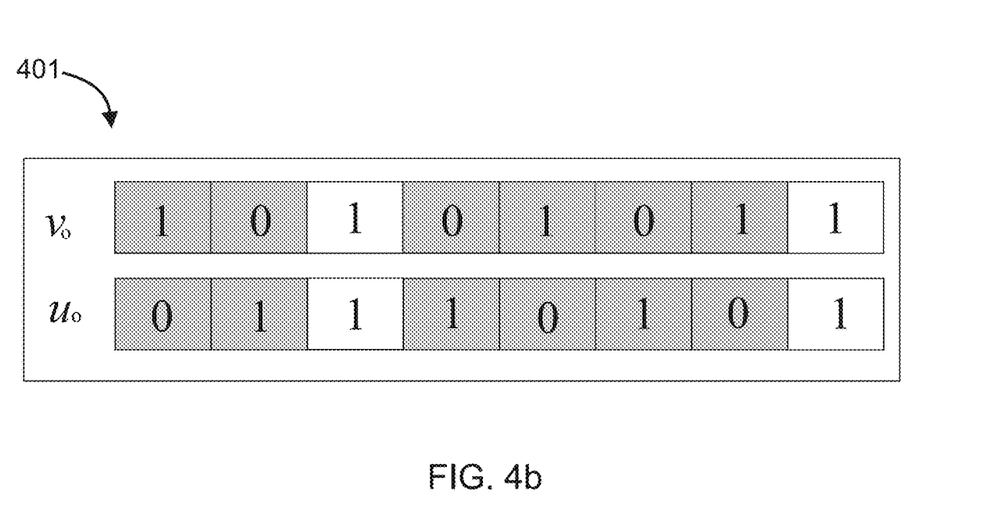
FIG. 4b illustrates an exemplary view of the hamming distance of output vectors, in accordance with at least one embodiment.

FIG. 4b illustrates an exemplary view 401 of the hamming distance of output vectors, in accordance with at least one embodiment. The nonlinearity is calculated by the hamming distance between two affine transformations. For example, two output vectors are: $v_o$ and $u_o$ of 8 bits each. As shown in FIG. 1, the hamming distance between the two vectors=6. Therefore, the non linearity of the function is 6. To generalize the concept of the nonlinearity of such a function $f_c$ is given as:

$$\mathcal{N}\ell_{f_c} = \Sigma_{i,j=1}{}^n v_{o_i} \ne u_{o_j}, v_{o_i} \text{ and } u_{o_j} \text{ are output vectors} \quad (26a)$$

Moreover following the Equation 11, the non-linearity of present BaReNPI true random system is also related with the Walsh transformation as:

$$\mathcal{N}l_{f_c} = 2^{n-1} - \frac{1}{2}\max|W_{f_c}(e)| \quad (26b)$$

Propagation characteristics are determined by the cryptographic properties of the derivatives of the functions generated by BaReNPI true random system. All derivatives of the combined functions that output from the SGFR are linearly equivalent when they have a fixed Hamming weight of n/2. Our function $f_c$ of N variables generated from the proposed BaReNPI True Random System satisfies the propagation criterion of degree k and order m if any affine function obtained from $f_c$ by keeping m input bits constant satisfies the propagation criterion of degree k.

Let $f_c \in \mathcal{B}_N$ and let $x, y \in F_2^N$ be such that $$wt(x) = wt(y) = \frac{n}{2}.$$

then, $D_x f_c$ and $D_y f_c$ are linearly equivalent. This signifies a linear permutation $\mu$ of $F_2^N$ such that $D_x f_c = D_y f_c \circ$, where $\circ$ is composite function. The permutation $\mu$ exists on $\{1, 2, \ldots, N\}$ such that $y = \mu(x)$. Since, $f_c$ is symmetric and balanced, the present system obtains:

$$D_y f_c(\mu(a)) = f_c(\mu(a)) \boxplus f_c(\mu(a) + y) \quad (27)$$
$$= f_c(a) \boxplus f_c(\mu(a) + \mu(x))$$
$$= f_c(a) \boxplus f_c(\mu(a+x))$$
$$= f_c(a) \boxplus f_c(a+x)$$
$$= D_x f_c(a)$$

Let k be an integer, $1 \le k \le n-1$, $\nabla_j = \langle v_{i_1}, v_{i_2}, \ldots, v_{i_{n-k}} \rangle$ and $\varepsilon_k = v_{n-k+1} + \ldots + v_n$. Then the restriction of $D_{\varepsilon_k} f_c$ to all affine subspaces $y+V$, $y \in \langle v_{i_1}, v_{i_2}, \ldots, v_{i_{n-k}} \rangle$ is given by:

$$g_y: V \to F_2 \quad (28)$$

$$x \mapsto D_{\varepsilon_k} f_c(a+y) \quad (29)$$

Equations (28) and (29) are also symmetric functions of (n−k) variables and, weight is n/2. Moreover, their simplified value vectors and ANF vectors are given for all $0 \le i \le n-k$ by:

$$g_{c_{g_y}}(i) = g_c(i + wt(y)) \boxplus g_c(i + k - wt(y)) \quad (30)$$

$$\lambda_{g_y}(i) = \oplus_{j \le k - wt(y)} \oplus_{j \le wt(y)} \lambda_f(i+j) \boxplus \lambda_f(i+j), \quad (31)$$

Let $\in \nabla_j$, then for any $z = a+y$ with $a \in \nabla$, then the following equation is obtained.

$$wt(z) = wt(a) + wt(y) \quad (32)$$

$$wt(z + \varepsilon_k) = wt(a) + wt(y + \varepsilon_k) = wt(a) + k - wt(y) \quad (33)$$

Thus, $\forall a \in V$, $$D_{\varepsilon_k} f_c(a+y) = f_c(a+b) \boxplus f_c(a + \varepsilon_k + y) = wt(a) + wt(y + \varepsilon_k) = \quad (34)$$
$$wt(a) + k - wt(y) = g_c(wt(a) + w(y)) \boxplus (wt(a) + k - w(y))$$

Equation. 18 signifies $$g_{c_{g_y}}$$

also follows the symmetric property which means that partial derivatives of function generator outputs are also propagated with the propagation features. To calculate simplified ANF vector of $$g_{c_{g_y}},$$

the ANF of $f_c$ is decomposed as given below.

$$f_c(a+b) = \oplus_{u \in F_2^{n-k}} \oplus_{v \in F_2^k} \lambda_{u,v} \Pi_{i=1}^{n-k} a_i^{u_i}$$
$$\Pi_{j=n-k+1}^{n-k} b_j^{v_j}, \forall (a,b) \in (V, \overline{V}) \quad (35)$$

Then, for any $y \in \overline{V}$ and $a \in V$, the following equation is obtained, $$g_{c_{g_y}}(a) = D_{\varepsilon_k} f_c(a+y) = \quad (36)$$
$$\oplus_{u \in F_2^{n-k}} \oplus_{v \in F_2^k} \lambda_{u,v} \Pi_{i=1}^{n-k} a_i^{u_i} \times (\Pi_{i=1}^{k}(y_i \boxplus 1)^{v_i} \boxplus \Pi_{i=1}^{k} y_i^{v_i}$$

The present disclosure further discusses the correlation immunity characteristics exhibit by our proposed generator's outputs. Considering each of the N input variables $V_i$ as n bit binary vector $V_i = \{v_1, v_2, \ldots, v_n\} i=1, 2, \ldots, N$, for the combined symmetric and balanced function $f_c$, $f_c$ is correlation immune if:

$$Prob(f_c = v_i) = \frac{1}{2}, 1 \le i \le n \quad (37)$$

The set of all correlation immune functions of N variables of n bits each is denoted by $CI_N^n$. Further, the weight of correlation immune function $f$ of our proposed generator is given by:

$$a = wt(f_c) = \frac{n}{2}, f_c \in CI_N^n \quad (38)$$

Let, $f_c^u$ and $f_c^l$ be the upper and lower halves of equal length n/2 for our function generator's outputs as shown in FIG. 3. As, $f_c \in CI_N^n$, $$wt(f_c^u) = wt(f_c^l) = \frac{n}{4}.$$

If there are k places out of n/4 1's in the $f_c^u$ where the corresponding positions in reverse of $f_c^l$, denoted as $(f_c^l)^r$, do not match. Therefore, the number of bits match with respect to 1 for the function is given as:

$$M_1(f_c^u, (f_c^l)^r) = \frac{n}{4} - k \quad (39)$$

Following the Equation 23, assumed that there are k places out of n/4 1's in the $f_c^u$ where the corresponding positions in $(f_c^l)^r$ do not match. Therefore, the number of bits match with respect to 0 for the function is given as:

$$M_0(f_c^u, (f_c^l)^r) = \frac{n}{4} - k \quad (40)$$

Figure 4C:
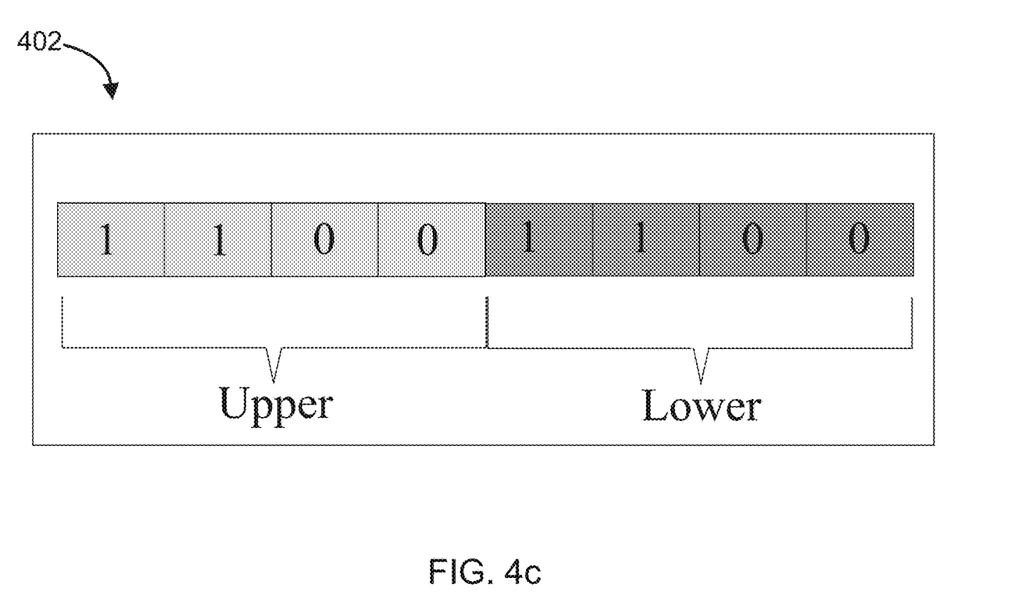
FIG. 4c illustrates a conceptual diagram of the lower and upper halves of the bit string, in accordance with at least one embodiment.

FIG. 4c illustrates a conceptual diagram 402 of the lower and upper halves of bit string, in accordance with at least one embodiment. Hence, the following expression can be obtained:

$$M(f_c, (f_c)^r) = 2M(f_c^u, (f_c^l)^r) = 2\left(\frac{n}{4} - k + \frac{n}{4} - k\right) = n - 4k \quad (41)$$

The correlation immune functions with the same values of $M(f_c, (f_c)^r)$ form an equivalence class.

Proposition 3: Let $f_c \in CI_N^n$; and $M(f_c, (f_c)^r) = m$. Then $\forall M_0(f_c, (f_c)^r)$ and $M_1(f_c, (f_c)^r)$ Min $[M_0(f_c,(f_c)^r) - M_1(f_c,(f_c)^r)]$=min $[m] \mapsto 0$ Apart from the correlation immunity, algebraic immunity is also a requirement for cryptographic algorithms. Algebraic immunity also is related with the annihilator of a function. This property helps the algorithm to prevent algebraic attacks against the cryptographic algorithms.

Given, $f_c \in \mathcal{B}_N$, any function of the set $A(f_c) = \{g \in \mathcal{B}_N | gf = 0\}$ is defined as the annihilator of the function $f_c$. The algebraic immunity of $f_c$ is denoted by $AI(f_c)$ is minimum degree of all nonzero annihilators of $f_c$ or $f_c+1$. The value of $AI(f_c)$ is given as:

$$AI(f_c) = \min[\deg(g) | g \neq 0, g \in A(f_c) \cup A(f_c+1)] \quad (42)$$

As the present BaReNPI true random system outputs the symmetric function which is balanced and therefore minimum degree is always n/2. Therefore, the algebraic immunity is always n/2 which is always optimal.

Figure 5:
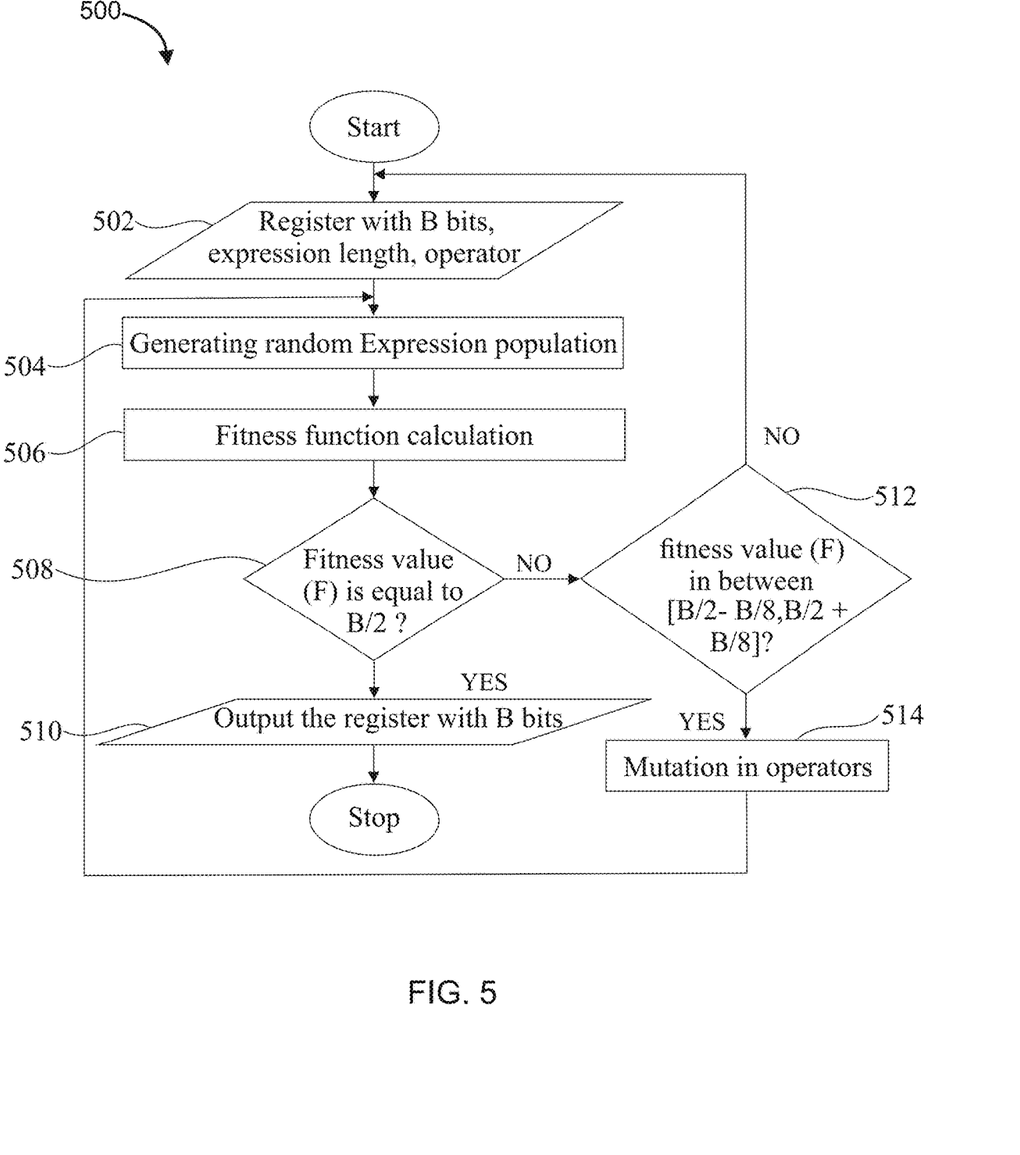
FIG. 5 illustrates a flowchart of the present method for generating a symmetrically balanced output to accomplish a plurality of predefined properties, in accordance with at least one embodiment.

FIG. 5 illustrates a flowchart 500 of the present method for generating a symmetrically balanced output to accomplish a plurality of predefined properties, in accordance with at least one embodiment. In an embodiment, the predefined properties comprise balancedness, resiliency, non-linearity, propagation, immunity, and symmetricity. The method comprises a step 502 of receiving a plurality of registers with B bits, an expression length, and a plurality of operators through a receiving module. In an embodiment, the expression length is a number of terms in a combined function. In an embodiment, the combined function comprises the logic gates to strengthen a plurality of hash algorithms, a plurality of stream ciphers and a round function module of block ciphers.

The method then includes a step 504 of generating a random expression population through a random expression population generation module. Further, the method includes the step 506 of computing a fitness value (fitness function) of the random expression population through a fitness function module. The method then includes a step 508 of determining if the computed fitness value (F) is equal to B/2. The method then includes the step 510 of providing registers with B bits if a plurality of output bits are having an equal number of 1s and 0s through a conditional module. The conditional module performs a step 514 of mutation in the operators if the output bits are not having an equal number of 1s and 0s, i.e., no. of 1=no. of 0=B/2 (considering B is a total number of the bits). In an embodiment, the mutation in the operators is performed by changing a combination of at least one a plurality of logic gates, the registers and a plurality of variables. Further, the present method includes a step 512 of determining if the computed fitness value is not equal to B/2, the present method checks if the fitness value lies between a predefined range and then performs mutation in operators. If the fitness value does not lie in the predefined range, then the method reinitiates the overall operation. In an embodiment, the present method utilizes a hamming distance of output string to compute a distance between at least two strings of equal length.

Thus the present system provides an efficient, simpler and more elegant true random system that produces the symmetric balanced output that fulfills the properties such as balancedness, resiliency, non-linearity, propagation, and immunity (BaReNPI). Further, the present system and method output a combined function comprises logic gates to help the hash algorithms, stream ciphers and round function module of block ciphers to be more robust. The combined function can be used in different crypto-graphic modules. Additionally, the present invention randomly selects the Boolean functions and variable inputs for the functions. The input variables are not dependent on the output analysis except the variable length and expression length.

Further, the present disclosure describes the validation of the present system performed during the experiments. Following is the table 1 to describe the significance of the statistical tests for randomness.

| Test Name | Significance |
|---|---|
| Monobit | To check the frequency of 1 and 0 to be equal |
| Frequency test within a block | Extended from the previous test for M bit block |
| Runs Test | To check the oscillation of 1 and 0 is fast |
| Test for longest run | Longest ran of 1s in an M bit block |
| Binary matrix rank test | To check for linear dependency among fixed length substrings |

-continued

| Test Name | Significance |
|---|---|
| Spectral test | To check repetitive patterns |
| Nonoverlapping template matching | Whether a given pattern is present and its no. of occurrences as expected. | critical value. This value of 0.01 is also called the level of significance. If the p-value is greater than the level of significance, the null hypothesis can be accepted. The summarization of the p-values of the above said tests is given in Table-2.

Table 2 provides statistical tests on the present BaReNPI True Random System

| | Monobit test | Frequency test within a block | Runs test | Test for the longest run in the block | Binary matrix rank test |
|---|---|---|---|---|---|
| Proposed BARENPI TRUE RANDOM SYSTEM | 1.00 | 1.00 | 0.723 | 0.1933 | 0.5320 |
| | Spectral test | Non-overlapping template matching test | Overlapping template matching test | Maurer's test | Linear complexity test |
| | 0.300 | 0.300 | 0.280 | 0.777 | NA |
| | Serial test | Approximate entropy test | Cumulative sum test | Random excursions test | Random excursions variant test |
| | NA | 0.2770 | 0.433 | 0.777 | 0.777 |

-continued

| Test Name | Significance |
|---|---|
| Test Overlapping template matching Test | Same as previous but overlapping is allowed in this process. |
| Maurers test | No. of bits in between of two matched patterns |
| Linear complexity Test | To check the feedback of LFSR. Therefore NA in our case. |
| Serial Tests | For overlapping pattern frequencies. Extended from Overlapping pattern matching test. Therefore, not performed as per NIST recommendation. |
| Approximate entropy test | To compare the frequency of overlapping blocks for two consecutive lengths |
| Cumulative Sum test | To check if any bitsum is too large or too small |
| Random Excursions | No. of cycles having exactly k visits |
| Random Excursions variant | To detect deviations from the expected number of visits to various states in the random walk. |

To perform the tests, the hypothesis has been set up for all the tests as:

$H_0$ (null hypothesis): The outputs of BaReNPI True Random System is random.

$H_1$ (alternate hypothesis): The outputs of BaReNPI True Random System is non-random.

For each of the applied tests, a decision or conclusion is taken that accepts or rejects the null hypothesis which means whether the present BaReNPI True Random System is (or is not) able to produce random values, based on the sequence that is produced. For each test, a relevant randomness statistic is chosen and used to determine the acceptance or rejection of the null hypothesis. Under an assumption of randomness, such a statistic has a distribution of possible values. A theoretical reference distribution of this statistic under the null hypothesis is determined by mathematical methods which determine a critical value. During a test, a test statistic value (p-value) is computed on the data or sequence of bits generated by the BaReNPI True Random System. This test statistic value is compared to the critical value. If the test statistic value is greater than the critical value, the null hypothesis for randomness is rejected else the null hypothesis is accepted. In practice, the reason that statistical hypothesis testing works is that the reference distribution and the critical value are dependent on and generated under a tentative assumption of randomness. If the randomness assumption is, in fact, true for the data at hand, then the resulting calculated test statistic value on the data will have a very low probability (e.g., 0.01) of exceeding the critical value. This value of 0.01 is also called the level of significance. If the p-value is greater than the level of significance, the null hypothesis can be accepted. The summarization of the p-values of the above said tests is given in Table-2.

Figure 6:
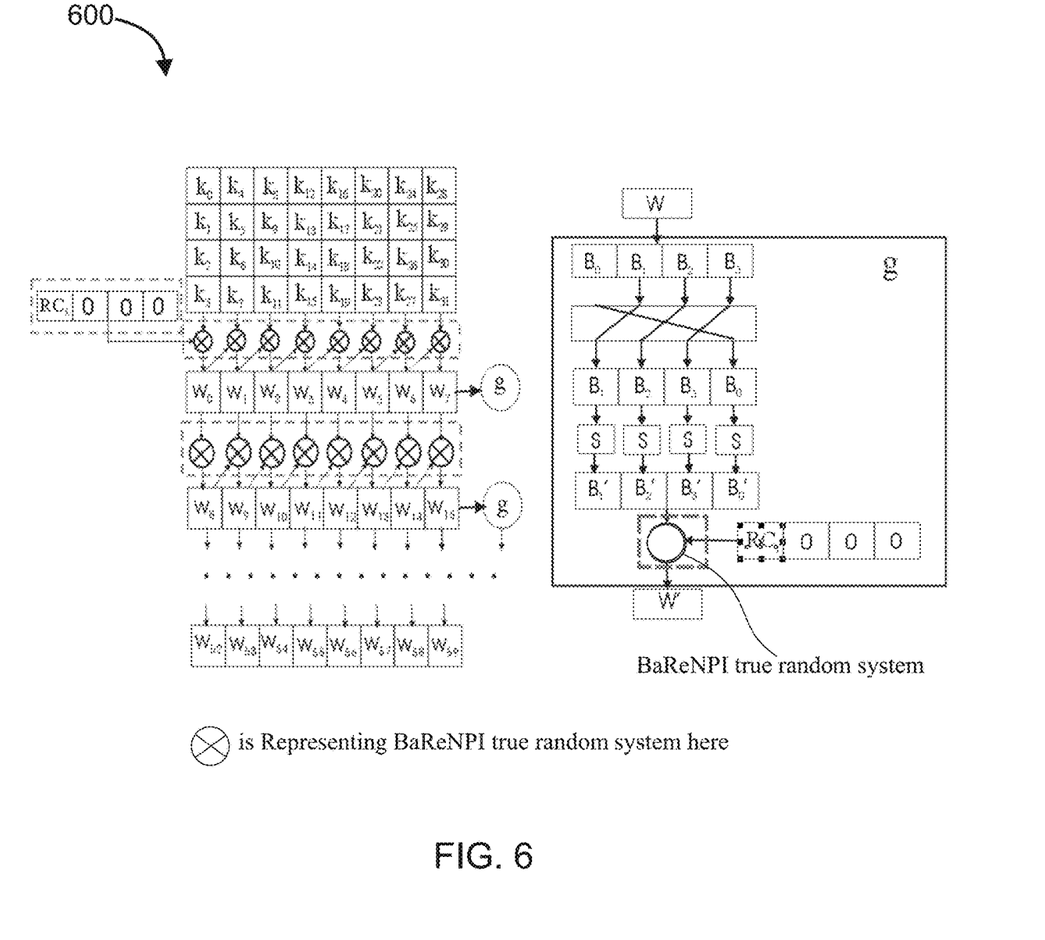
FIG. 6 illustrates an exemplary view of a modified key expansion for 14 round AES, in accordance with at least one embodiment.

The present true random system has been applied for two algorithms: AES (block cipher) and RC4 (stream cipher) which is further described in the present disclosure, Application of the true random system for key expansion module in AES: the main objective of the adding the functionalities of BaReNPI true random system in AES is to enable the key expansion module with some randomness feature. The modified key expansion module has been shown in FIG. 6, the changes are highlighted by dash lines. FIG. 6 illustrates an exemplary view 600 of a modified key expansion for 14 round AES, in accordance with at least one embodiment. The randomness of the present BaReNPI true random system has been used in three parts. First, in the function of g; secondly, the recursive word generation from key spaces, and thirdly but most prominently, addition of $RC_i$ and BaReNPI true random system for generating the words from $w_0$ to $w_7$.

As shown in FIG. 6, each column in the key space is considered as $w_i$ word. As the key size is 256 bits, the eight words $\{w_0, w_1, w_2, w_3, w_4, w_5, w_6, w_7\}$ are in the very first step. The $8^{th}$ word i.e. $w_7$ is going through a function g. This function is also using the BaReNPI functionalities just before the output of the function. The output of g is then used to generate the other words processing through a series of the present true random system. The same process is repeated till the required number of words for the 14 rounds in AES are generated. For the decryption process, the generated words are saved and used reversely with the cipher text to get back to the plaintext.

Figure 7:
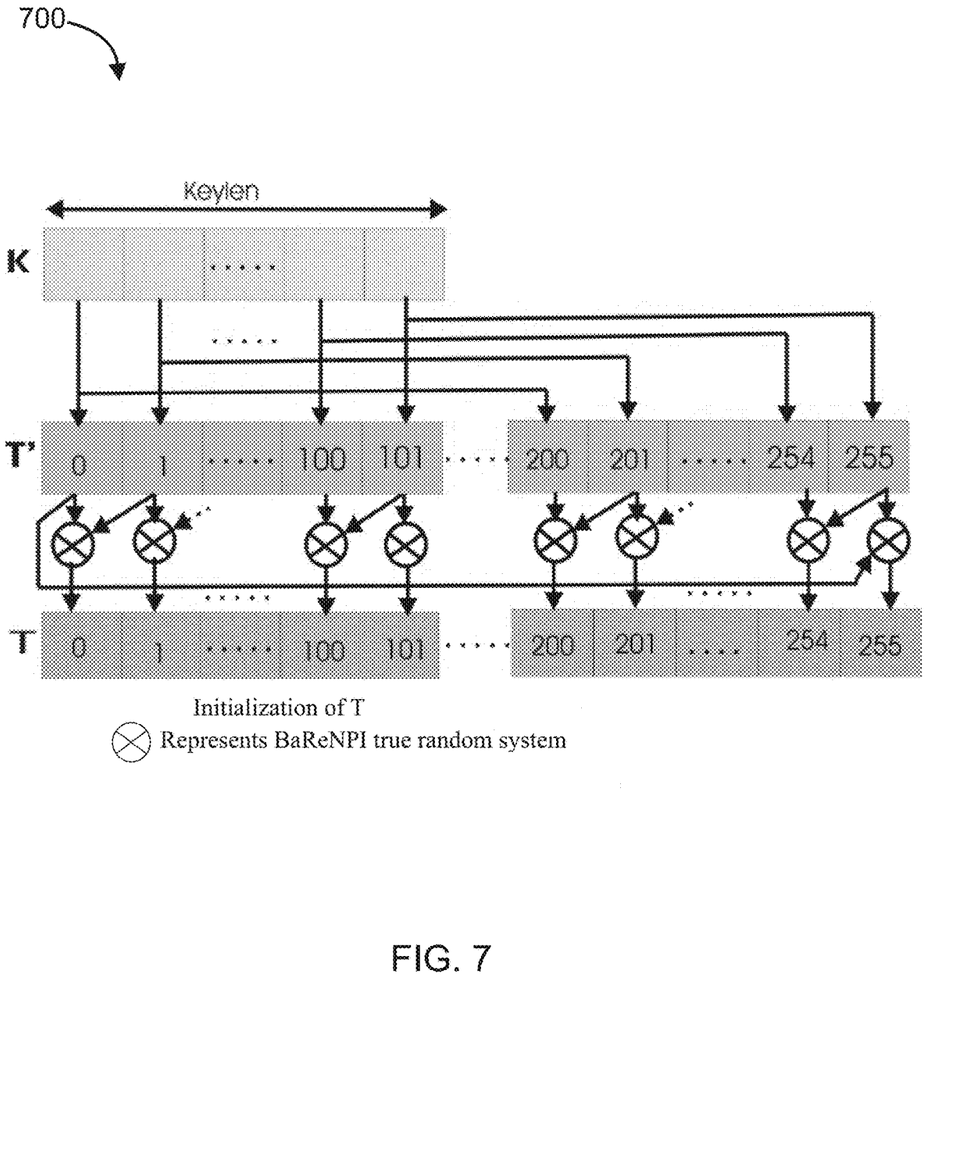
FIG. 7 illustrates an exemplary view of the proposed modification in RC4 scheme, in accordance with at least one embodiment.

Application of the true random system for key schedule randomization in RC4: the first stage of RC4 key scheduling is modified. In this modification, the present BaReNPI true random systems are added for each byte transferred from K to T. For this, the true random system gets two inputs from two consecutive bytes of K. The bytes in K are considered to be iterative till the completion of bytes of T. For the last byte of T to be generated the last byte of K (after expanding) and the first byte of K is considered as the inputs to the random system. At this time, the key stream is stored accordingly to byte for decryption process. The modification has been summarized in following Algorithm-1. All the other modules are kept same and therefore only the modified process is shown in FIG. 7. FIG. 7 illustrates an exemplary view 700 of the proposed modification in RC4 scheme, in accordance with at least one embodiment.

Algorithm-1

```
for i = 0 to 255 do
if (keylen==256)
then for j=0 to 255
T'[j]=k[i]
else
for j=0 to keylen
recursively copy k[j]to T'[i]
end loop
end loop
for i=0 to 254 do
    T[i] = T'[i]⊗T'[i+1] // ⊗ represents BaReNPI true random system
end loop
T[255] = T'[255]⊗T'[0]
```

While embodiments of the present disclosure have been illustrated and described, it will be clear that the disclosure is not limited to these embodiments only. Numerous modifications, changes, variations, substitutions, and equivalents will be apparent to those skilled in the art, without departing from the scope of the disclosure, as described in the claims.

What is claimed is:

1. A computer-implemented method for generating a symmetrically balanced output to accomplish a plurality of predefined properties, the method comprising steps of:
receiving a plurality of registers with B bits, an expression length, and a plurality of operators through a receiving module, wherein the expression length is a number of terms in a combined function, wherein the combined function comprises at least one of a plurality of logic gates configured to strengthen a plurality of hash algorithms, a plurality of stream ciphers and a round function module of block ciphers:
generating a random expression population through a random expression population generation module;
computing a fitness value of the random expression population through a fitness function module; and
providing the registers with B bits if a plurality of output bits have an equal number of 1 s and 0s through a conditional module, wherein the conditional module performs a mutation in the operators if the output bits do not have an equal number of 1s and 0s.

2. The method according to claim 1, wherein the mutation in the operators is performed by changing a combination of at least one of the plurality of logic gates, the registers and a plurality of variables.

3. The method according to claim 1, wherein the method further comprises the step of utilizing a hamming distance of output string to compute a distance between at least two strings of equal length.

4. The method according to claim 1, wherein the predefined properties comprise balancedness, resiliency, nonlinearity, propagation, immunity, and symmetricity.

5. A system for generating a symmetrically balanced output to accomplish a plurality of predefined properties, the system comprises:
a processor; and
a memory to store machine-readable instructions that when executed by the processor cause the processor to:
receive a plurality of registers with B bits, an expression length, and a plurality of operators, wherein the expression length is a number of terms in a combined function, wherein the combined function comprises at least one of a plurality of logic gates configured to strengthen a plurality of hash algorithms, a plurality of stream ciphers and a round function module of block ciphers;
generate a random expression population;
compute a fitness value of the random expression population; and
provide the registers with B bits if a plurality of output bits have an equal number of 1 s and 0s, wherein a mutation in the operators is performed if the output bits do not have an equal number of 1s and 0s.

6. The system according to claim 5, wherein the mutation in the operators is performed by changing a combination of at least one of the plurality of logic gates, the registers and a plurality of variables.

7. The system according to claim 5, wherein the machine-readable instructions, when executed by the processor, further cause the processor to utilize a hamming distance of output string to compute a distance between at least two strings of equal length.

8. The system according to claim 5, wherein the predefined properties comprise balancedness, resiliency, nonlinearity, propagation, immunity, and symmetricity.

9. A device in a network, comprising:
a non-transitory storage device having embodied therein one or more routines operable to generate a symmetrically balanced output to accomplish a plurality of predefined properties; and one or more processors coupled to the non-transitory storage device and operable to execute the one or more routines, wherein the one or more routines include:
a receiving module to receive a plurality of registers with B bits, an expression length, and a plurality of operators, wherein the expression length is a number of terms in a combined function, wherein the combined function comprises at least one of a plurality of logic gates configured to strengthen a plurality of hash algorithms, a plurality of stream ciphers and a round function module of block ciphers:
a random expression population generation module to generate a random expression population;
a fitness function module to compute a fitness value of the random expression population; and
a conditional module to provide the registers with B bits if a plurality of output bits have an equal number of 1s and 0s, wherein the conditional module performs mutation in the operators if the output bits do not have an equal number of 1s and 0s.

10. The device according to claim 9, wherein the mutation in the operators is performed by changing a combination of at least one of the plurality of logic gates, the registers and a plurality of variables.

11. The device according to claim 9, wherein the one or more routines includes utilizing a hamming distance of output string to compute a distance between at least two strings of equal length.

12. The device according to claim 9, wherein the predefined properties comprise balancedness, resiliency, nonlinearity, propagation, immunity, and symmetricity.

* * * * *